(12) United States Patent
Lim et al.

(10) Patent No.: US 12,136,836 B2
(45) Date of Patent: Nov. 5, 2024

(54) MULTI-PORT CHARGING DEVICE WITH MULTIPLE CHARGERS

(71) Applicant: Renesas Electronics America Inc., Milpitas, CA (US)

(72) Inventors: Sungkeun Lim, Apex, NC (US); Yen-Mo Chen, Morrisville, NC (US); Keeho Shin, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 532 days.

(21) Appl. No.: 17/479,214

(22) Filed: Sep. 20, 2021

(65) Prior Publication Data
US 2023/0098567 A1   Mar. 30, 2023

(51) Int. Cl.
*H02J 7/00* (2006.01)
*H02J 7/34* (2006.01)

(52) U.S. Cl.
CPC .......... *H02J 7/0013* (2013.01); *H02J 7/0042* (2013.01); *H02J 7/00712* (2020.01); *H02J 7/342* (2020.01); *H02J 2207/20* (2020.01)

(58) Field of Classification Search
CPC ..... H02J 7/0013; H02J 7/0042; H02J 2207/20
See application file for complete search history.

(56) References Cited

U.S. PATENT DOCUMENTS

2017/0279284 A1\* 9/2017 Lim ..................... H02J 7/0045

\* cited by examiner

*Primary Examiner* — Robert Grant
(74) *Attorney, Agent, or Firm* — SCULLY, SCOTT, MURPHY & PRESSER, P.C.

(57) ABSTRACT

Battery charger systems and apparatuses are described. In an example, an apparatus may include a first controller, a first port connected to the first controller, a first charger module connected to the first controller, a second controller, a second port connected to the second controller, and a second charger module connected to the second controller. The first controller may be configured to form a first connection path between the first charger module and the second port via the second controller. The first controller may be further configured to form a second connection path between the second charger module and the first port via the first controller.

20 Claims, 10 Drawing Sheets

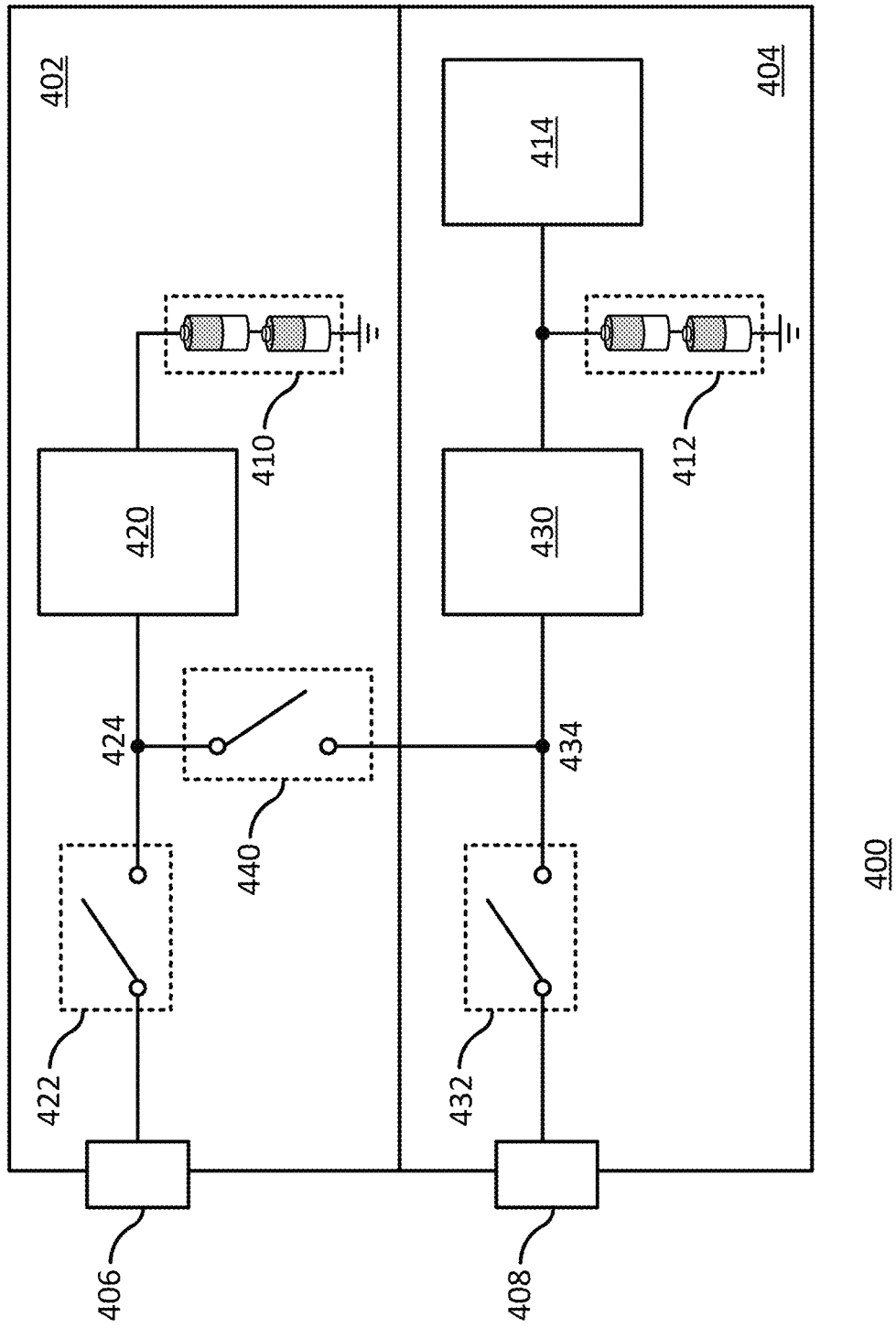

MULTI-PORT CHARGING DEVICE WITH MULTIPLE CHARGERS

BACKGROUND

The present disclosure relates in general to apparatuses, methods, and systems for battery chargers for systems having multiple separate chargers for battery stacks.

In an example, some battery charger products may include multiple universal serial bus (USB) type-C ports, multiple charger modules, and one or more battery stacks. Each USB type-C port may be connected to an individual charger module. The charger modules connected to the multiple USB type-C ports may be controlled separately.

SUMMARY

In some examples, a battery charger apparatus is generally described. In an example, the apparatus may include a first controller, a first port connected to the first controller, a first charger module connected to the first controller, a second controller, a second port connected to the second controller, and a second charger module connected to the second controller. The first controller may be configured to form a first connection path between the first charger module and the second port via the second controller. The first controller may be further configured to form a second connection path between the second charger module and the first port via the first controller.

In some examples, a battery charger apparatus is generally described. The apparatus may include a first port connected to a controller, a first charger module connected to the controller. The controller may be configured to form a first connection path between the first charger module and a second port of a subsystem connected to the apparatus. The controller may be further configured to form a second connection path between a second charger module of the subsystem and the first port, the second charger module being connected to a battery.

In some examples, a battery charger apparatus is generally described. The apparatus may include a first port connected to a first switch, a first charger module connected between the first switch and one or more batteries, a second port connected to a second switch, a second charger module connected between the second switch and the one or more batteries, and a third switch connected between a first node and a second node. The first node may be between the first charger module and the first switch. The second node may be between the second charger module and the second switch. In response to the third switch being switched on, the first charger module may be connected to the second port in response to the second switch being switched on, and the second charger module may be connected to the first port in response to the first switch being switched on.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 is a diagram showing another example system that can implement multi-port charging device with multiple chargers in one embodiment.

DETAILED DESCRIPTION

Figure 1:
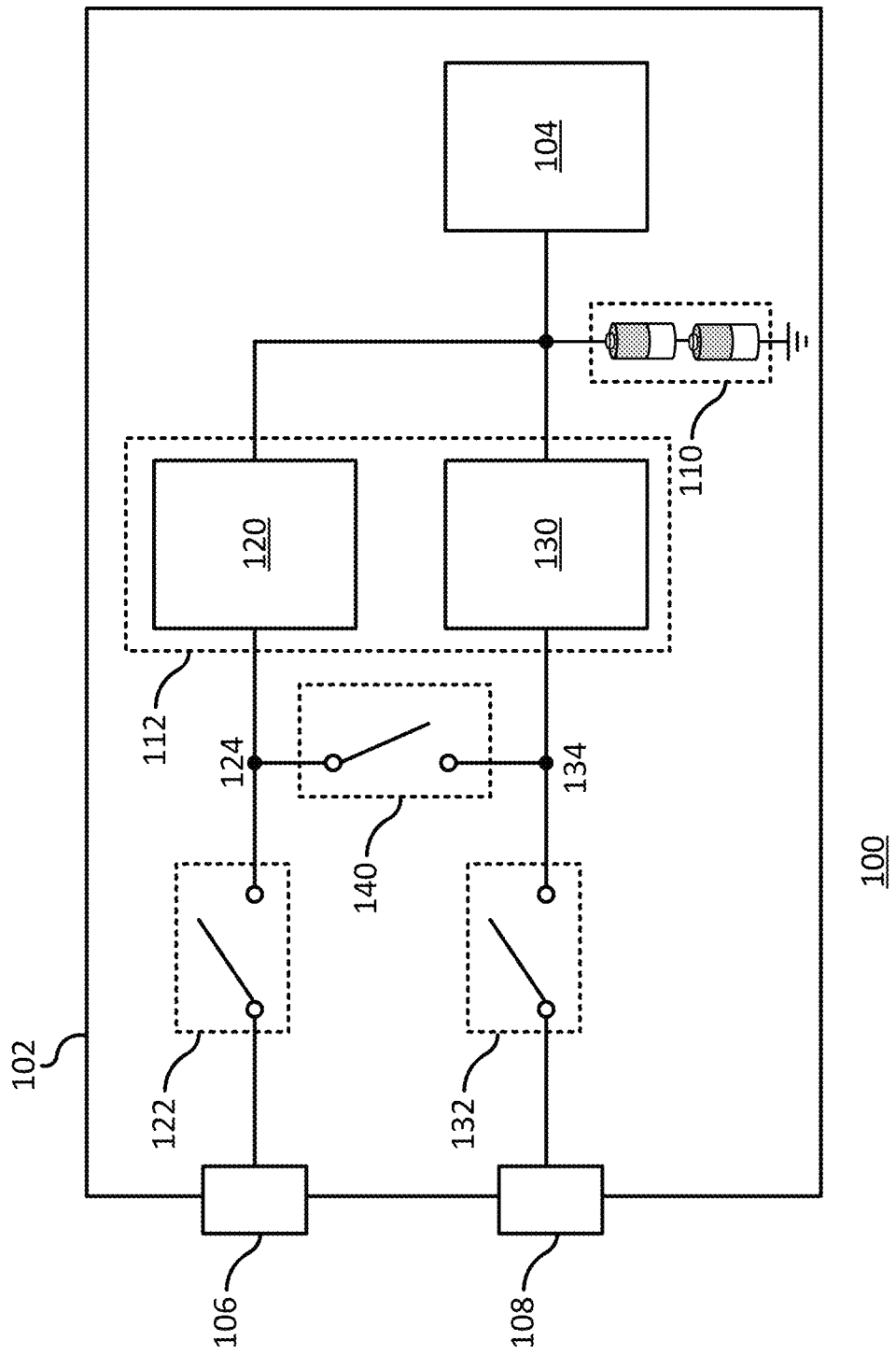
FIG. 1 is a diagram showing an example system that can implement multi-port charging device with multiple chargers in one embodiment.

FIG. 1 is a diagram showing an example system 100 that can implement multi-port charging device with multiple chargers in one embodiment. The system 100 may include a device 102. The device 102 may be, for example, a computing device such as a desktop computer, a notebook computer, a laptop computer, a tablet computer, a cellular phone (or mobile phone or smartphone), etc., a power bank, or any system using a battery and capable of receiving power from an adapter. The device 102 may include a port 106, a port 108, a battery stack 110, a switch 122, a switch 132, a charger circuit or device 112, a switch 140, and a load 104. In an example, the ports 106, 108 may be USB type-C ports. The load 104 may be, for example, a device or component of the device 102 that may consume power from the battery stack 110, such as a central processor unit (CPU), a microprocessor, a motherboard, a display or screen, etc. In an example, the battery stack 110 may provide power to more than one load among the device 102.

The charger circuit 112 may include a charger module 120 and a charger module 130. In an example, the charger modules 120, 130 may be battery chargers implemented using DC-DC power converters (e.g., suitable buck, boost, step-down, step-up, buck-boost, or step-up/step-down power converters), power supplies adapted for charging batteries, battery cells or battery stacks for battery-operated products. The charger modules 120, 130 may be configured to charge the batteries among the battery stack 110. The battery stack 110 may include one or more batteries.

Each one of the switches 122, 132 may be implemented using, for example, field-effect transistors (FET) such as metal-oxide semiconductor field-effect transistors (MOSFET), power MOSFET, or other suitable semiconductor transistor device capable of being switched on and off in response to a control signal. For example, the switches 122, 132 may be FETs that can be switched on (e.g., closed or conducting) or off (e.g., open or not conducting) in response to control signals being applied to their gate terminals.

The switch 140 may be connected between a node 124 and a node 134, where the node 124 may be located between the switch 122 and the charger module 120, and the node 134 may be located between the switch 132 and the charger module 130. The switch 140 may be implemented using, for example, a FET such as a MOSFET, a power MOSFET, or other suitable semiconductor transistor device capable of being switched on and off in response to a control signal. For example, the switch 140 may be a FET that can be switched on (e.g., closed or conducting) or off (e.g., open or not conducting) in response to control signals being applied to its gate terminal.

When the switch 140 is switched off, the chargers 120, 130 may operate based on the switches 122, 132, respectively. In the example shown in FIG. 1, when switches 122, 132, and 140 are switched off, the charger modules 120, 130 may be in an idle state and the system 100 may be in a battery-only mode. Under the battery-only mode, the battery stack 110 may provide power to the load 104.

In an example, when the switch 140 is switched off, a power adapter is connected to the port 106, and the switch 122 is switched on, the charger module 120 may be configured to receive an input voltage from the connected power adapter. The charger module 120 may use the received input voltage to charge the batteries among the battery stack 110. In another example, when the switch 140 is switched off, a power consuming device or an on-the-go (OTG) device is connected to the port 106, and the switch 122 is switched on, the charger module 120 may be configured to provide power to the OTG device connected to the port 106. Examples of OTG device may include a cellular phone, a wearable device, a network adapter, a communication interface adapter (e.g., Bluetooth adapter), a gaming console, a display, a charging cable connected to a power consuming device, etc.

In an example, when the switch 140 is switched off, a power adapter is connected to the port 108, and the switch 122 is switched on, the charger module 130 may be configured to receive an input voltage from the connected power adapter. The charger module 130 may use the received input voltage to charge the batteries among the battery stack 110. In another example, when the switch 140 is switched off, an OTG device is connected to the port 108, and the switch 132 is switched on, the charger module 130 may be configured to provide power to the OTG device connected to the port 108.

The switch 140 may be switched on in order to connect the charger module 120 to the port 108, and to connect the charger module 130 to the port 106. The cross-connection between the charger module 120 and the port 108, and the charger module 130 and the port 106, may allow the battery stack 110 to be charged by both charger modules 120, 130 in response to one power adapter being connected to either one of the ports 106, 108. By using both charger modules 120, 130 to charge the battery stack 110, the battery stack 110 may be charged at a relatively higher power. Further, the cross-connection between the charger module 120 and the port 108, and the charger module 130 and the port 106, may allow the on-the-go (OTG) device connected to one of the ports 106, 108 to be charged by both charger modules 120, 130 using power from the battery stack 110. By using both charger modules 120, 130 to charge the connected OTG device, the OTG device may be charged at a relatively higher power.

Figure 2:
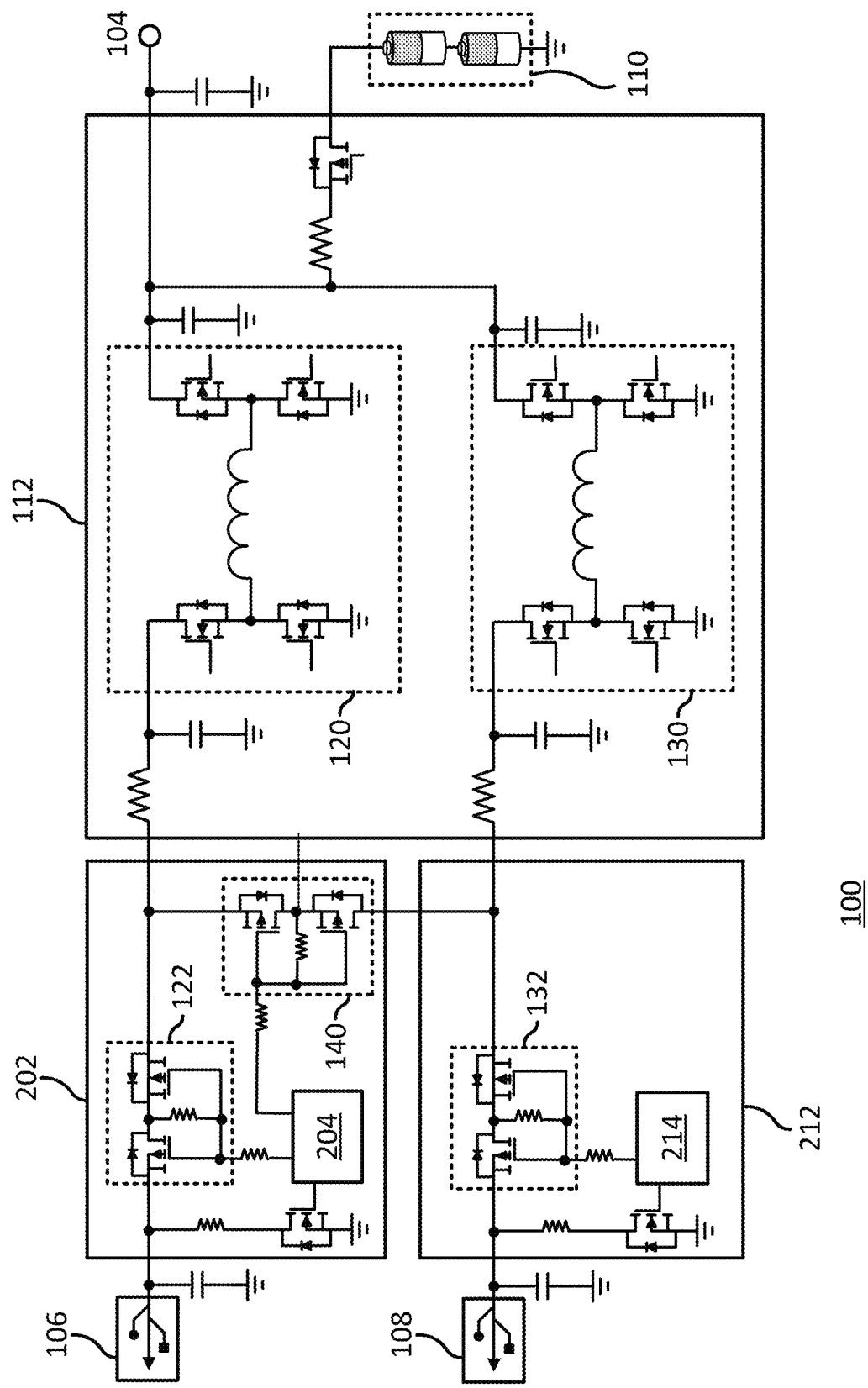
FIG. 2 is a diagram showing details of the example system of FIG. 1 in one embodiment.

FIG. 2 is a diagram showing details of the example system of FIG. 1 in one embodiment. In the example shown in FIG. 2, the switches 122, 140 may be parts of a controller 202.

The controller 202 may be configured to detect whether a device is connected to the port 106 or not. A device that may be connected to the port 106 may be, for example, a power adapter, or a power consuming device (e.g., an OTG device). Based on whether a device is connected to the port 106 or not, the controller 202 may turn the switches 122, 140 on or off. For example, in response to a detection that a power adapter or a power consuming device is connected to the port 106, a port detection integrated circuit (IC) 204 may turn the switch 122 on by supplying a voltage sufficient to drive the gates of the MOSFETs among the switch 122.

Also, in the example shown in FIG. 2, the switch 132 may be a part of a controller 212. The controller 212 may be configured to detect whether a device is connected to the port 108 or not. A device that may be connected to the port 108 may be, for example, a power adapter, or a power consuming device (e.g., an OTG device). Based on whether a device is connected to the port 108 or not, the controller 212 may turn the switch 132 on or off. For example, in response to a detection that a power adapter or a power consuming device is connected to the port 108, a port detection IC 214 may turn the switch 132 on by supplying a voltage sufficient to drive the gates of the MOSFETs among the switch 132.

In an example, the port detection IC 204 may turn the switch 140 on or off independently from the switch 122. For example, switches 122, 140 may not need to be on or off simultaneously. In an example, the port detection IC 204 may turn the switch 140 on or off based on a user input (e.g., a button, or a setting in an operating system or software running on the device 102). Although the switch 140 is being shown as a part of the controller 202 in FIG. 2, in other implementations, the switch 140 may also be a part of the controller 212, or external to both controller 202 and 212. In another example embodiment, other embedded controllers that may be parts of the controllers 202, 212, may also control the switch 140.

Figure 3A:
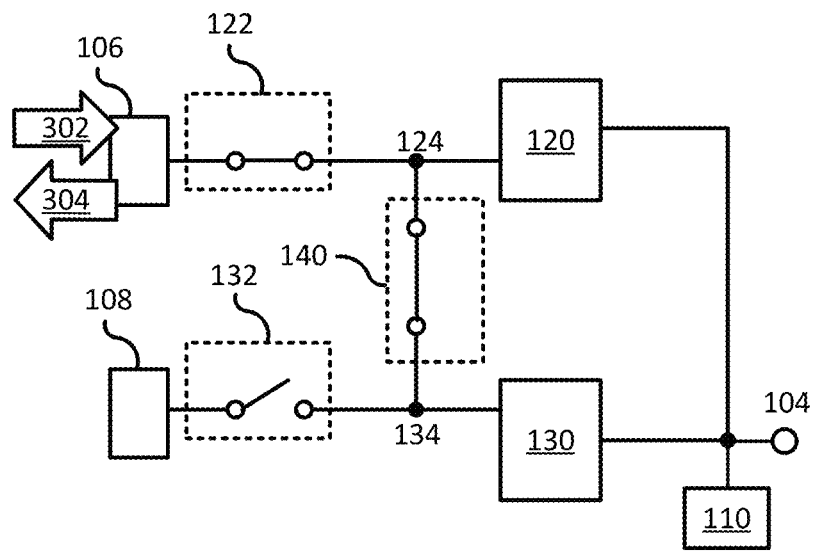
FIG. 3A is a diagram showing an example implementation of the example system of FIG. 1 in one embodiment.

FIG. 3A to FIG. 3D are diagrams showing example implementations of the example system 100 of FIG. 1 and FIG. 2. In FIG. 3A, the switches 122, 140 are switched on and the switch 132 is switched off. The switch 122 may be switched on in response to a power adapter 302, or a OTG device 304, being connected to the port 106. In the example shown in FIG. 3A, in response to the power adapter 302 being connected to the port 106, the charger modules 120, 130 may both charge the battery stack 110 using power provided by the connected power adapter 302. In the example shown in FIG. 3A, in response to the OTG device 304 being connected to the port 106, the charger modules 120, 130 may provide power from the battery stack 110 to the connected OTG device 304.

Figure 3B:
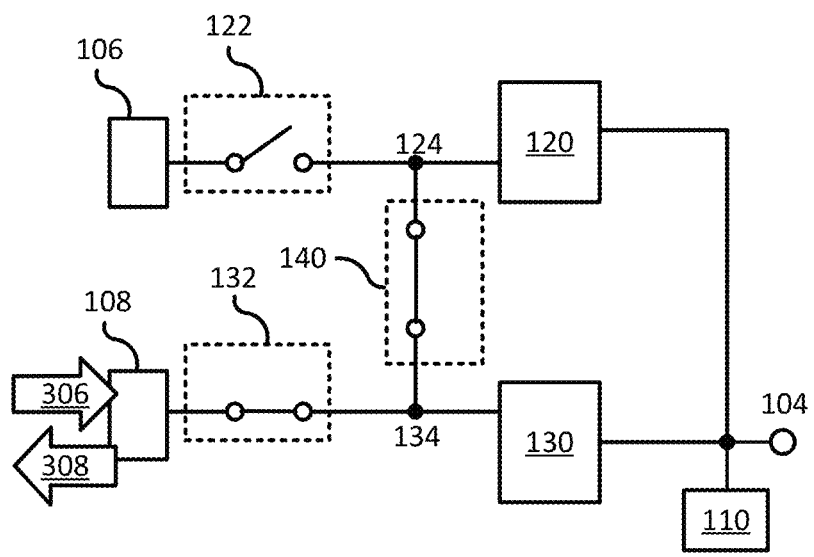
FIG. 3B is a diagram showing an example implementation of the example system of FIG. 1 in one embodiment.

In FIG. 3B, the switches 132, 140 are switched on and the switch 122 is switched off. The switch 132 may be switched on in response to a power adapter 306, or a OTG device 308, being connected to the port 108. In the example shown in FIG. 3B, in response to the power adapter 306 being connected to the port 108, the charger modules 120, 130 may both charge the battery stack 110 using power provided by the connected power adapter 306. In the example shown in FIG. 3B, in response to the OTG device 308 being connected to the port 108, the charger modules 120, 130 may provide power from the battery stack 110 to the connected OTG device 308.

Figure 3C:
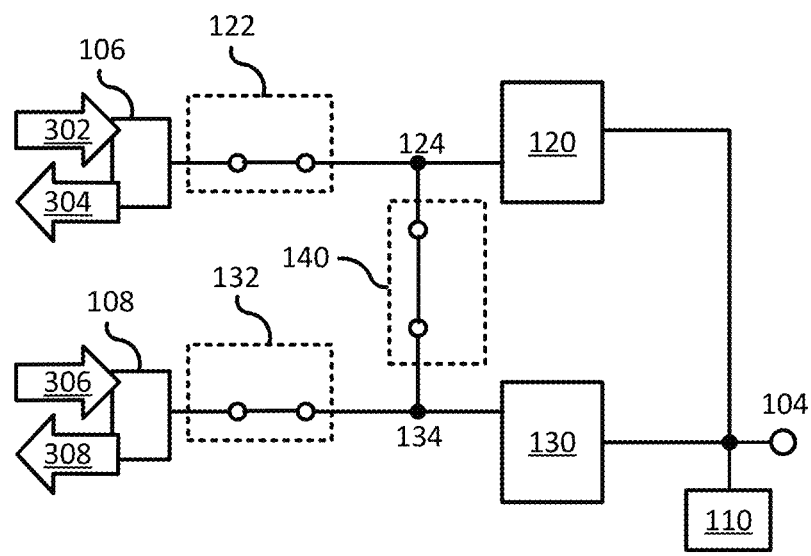
FIG. 3C is a diagram showing an example implementation of the example system of FIG. 1 in one embodiment.

In FIG. 3C, the switches 122, 132, 140 are switched on. The switch 122 may be switched on in response to a power adapter 302, or a OTG device 304, being connected to the port 106. The switch 132 may be switched on in response to a power adapter 306, or a OTG device 308, being connected to the port 108. In the example shown in FIG. 3C, in response to the power adapter 302 being connected to the port 106 and the power adapter 306 being connected to the port 108, the charger module 120 may charge the battery stack 110 using power provided by the power adapter 302 and the charger module 130 may charge the battery stack 110 using power provided by the power adapter 306.

In the example shown in FIG. 3C, in response to the OTG device 304 being connected to the port 106 and the OTG device 308 being connected to the port 108, the charger module 120 may provide power from the battery stack 110 to the OTG device 304 and the charger module 130 may provide power from the battery stack 110 to the OTG device 308.

In the example shown in FIG. 3C, in response to the OTG device 304 being connected to the port 106 and the power adapter 306 being connected to the port 108, the charger module 120 may provide power from the battery stack 110 to the OTG device 304 and the charger module 130 may charge the battery stack 110 using power from the power adapter 306. However, if the load 104 is a computing system that rejects the OTG device 304 connected to the port 106, then the charger modules 120, 130 may both charge the battery stack 110 using power from the power adapter 306 connected to the port 108. In an example, when a high-power adapter (e.g., if power adapter 306 is high power adapter) is plugged in through port 108, the computing system may need to charge the battery 110 with two chargers (e.g., charger module 120 and 130) since one charger may not be sufficient to charge the high power adapter. Thus, the computing system may reject an OTG device that may be plugged in through the other port 106.

In the example shown in FIG. 3C, in response to the OTG device 308 being connected to the port 108 and the power adapter 302 being connected to the port 106, the charger module 130 may provide power from the battery stack 110 to the OTG device 308 and the charger module 120 may charge the battery stack 110 using power from the power adapter 302. However, if the load 104 is a computing system that rejects the OTG device 308 connected to the port 108, then the charger modules 120, 130 may both charge the battery stack 110 using power from the power adapter 302 connected to the port 106.

Figure 3D:
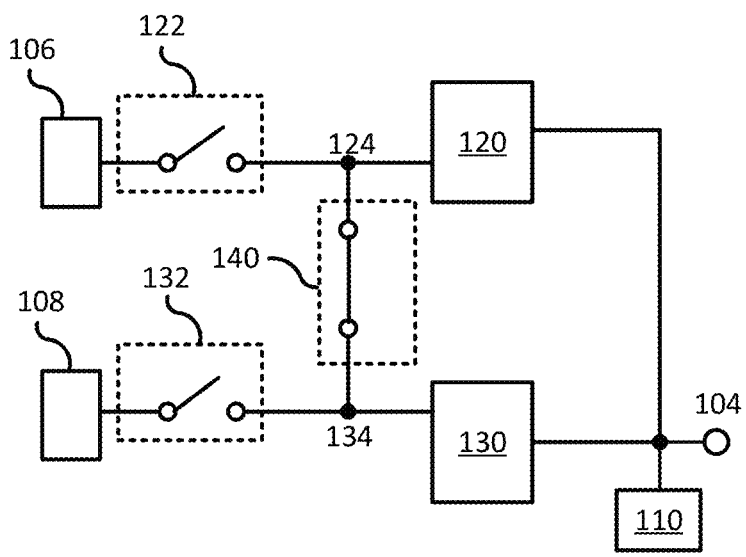
FIG. 3D is a diagram showing an example implementation of the example system of FIG. 1 in one embodiment.

In FIG. 3D, the switch 140 is switched on and the switches 122, 132 are switched off. The switch 140 may be switched on in response to, for example, a user input to the system 100 (e.g., a button, or settings in applications or software being run by the system 100). In the example shown in FIG. 3D, in response to the switch 140 being switched on and the switches 120, 130 being switched off, the system 100 may operate in a battery-only mode. In the battery-only mode, the battery stack 110 may be discharged to provide power to the load 104.

FIG. 4 is a diagram showing another example system that can implement multi-port charging device with multiple chargers in one embodiment. The system 400 may include a subsystem 402 and a subsystem 404. In an example, each one of the subsystems 402, 404 may include an individual set of components, such as central processing units (CPU), memory devices, network cards, input devices including touchscreens, etc. In the example, shown in FIG. 4, each one of the subsystems 402, 404 may include an individual battery stack, such as a battery stack 410 and a battery stack 412, respectively. In an example embodiment, the subsystem 402 may be a display screen and the subsystem 404 may be a main system of a computer device that include processing elements such as a motherboard. In another example embodiment, the subsystems 402, 404 may be two display screens of a device, such as a dual screen mobile phone.

The subsystem 402 may include a port 406, a battery stack 410, a switch 422, a charger circuit or module 420, and a switch 440. The subsystem 404 may include a port 408, a battery stack 412, a switch 432, a charger circuit or module 430, and a load 414. In an example, the ports 406, 408 may be USB type-C ports. The load 414 may be, for example, a device or component of the subsystem 404 that may consume power from the battery stack 412, such as a central processor unit (CPU), a microprocessor, a motherboard, a display or screen, etc. In an example, the subsystem 402 may be detachable from the subsystem 404, and the subsystem 402 may be attached to the subsystem 404 to implement the methods and systems described herein. For example, the subsystem 402 may be connected to the subsystem 404 via the switch 440.

In an example, the charger modules 420, 430 may be battery chargers implemented using DC-DC power converters (e.g., suitable buck, boost, step-down, step-up, buck-boost, or step-up/step-down power converters), power supplies adapted for charging batteries, battery cells or battery stacks for battery-operated products. The charger modules 420, 430 may be configured to charge the batteries among the battery stacks 410, 412, respectively. Each one of the battery stacks 410, 412 may include one or more batteries.

Each one of the switches 422, 432 may be implemented using, for example, field-effect transistors (FET) such as metal-oxide semiconductor field-effect transistors (MOSFET), power MOSFET, or other suitable semiconductor transistor device capable of being switched on and off in response to a control signal. For example, the switches 422, 432 may be FETs that can be switched on (e.g., closed or conducting) or off (e.g., open or not conducting) in response to control signals being applied to their gate terminals.

The switch 440 may be connected between a node 424 and a node 434, where the node 424 may be located between the switch 422 and the charger module 420, and the node 434 may be located between the switch 432 and the charger module 430. The switch 440 may be implemented using, for example, a FET such as a MOSFET, a power MOSFET, or other suitable semiconductor transistor device capable of being switched on and off in response to a control signal. For example, the switch 440 may be a FET that can be switched on (e.g., closed or conducting) or off (e.g., open or not conducting) in response to control signals being applied to its gate terminal.

When the switch 440 is switched off, the chargers 420, 430 may operate based on the switches 422, 432, respectively. In the example shown in FIG. 4, when switches 422, 432, and 440 are switched off, the charger modules 420, 430 may be in an idle state and the system 400 may be in a battery-only mode. Under the battery-only mode of the system 400, the battery stack 412 may provide power to the load 414, and the battery stack 410 may be idle and not be charged by the charger module 420, and not be discharged either.

In an example, when the switch 440 is switched off, a power adapter is connected to the port 406, and the switch 422 is switched on, the charger module 420 may be configured to receive an input voltage from the connected power adapter. The charger module 420 may use the received input voltage to charge the batteries among the battery stack 410. In another example, when the switch 440 is switched off, a power consuming device or an on-the-go (OTG) device is connected to the port 406, and the switch 422 is switched on, the charger module 420 may be configured to provide power to the OTG device connected to the port 406 by discharging the battery stack 410. When the switch 440 and the switch 422 are switched off, the charger module 420 may be in an idle state and the battery stack 410 may not be charged by the charger 420. Examples of OTG device may include a cellular phone, a wearable device, a network adapter, a communication interface adapter (e.g., Bluetooth adapter), a gaming console, a display, a charging cable connected to a power consuming device, etc.

In an example, when the switch 440 is switched off, a power adapter is connected to the port 408, and the switch 422 is switched on, the charger module 430 may be configured to receive an input voltage from the connected power adapter. The charger module 430 may use the received input voltage to charge the batteries among the battery stack 412. In another example, when the switch 440 is switched off, an OTG device is connected to the port 408, and the switch 432 is switched on, the charger module 430 may be configured to provide power to the OTG device connected to the port 408. When the switch 432 is switched off, the charger module 430 may be in an idle state. When the switch 440 and the switch 432 are switched off, the charger module 430 may be discharge the battery stack 412 to provide power to the load 414.

The switch 440 may be switched on in order to connect the charger module 420 to the port 408, and to connect the charger module 430 to the port 406, forming a cross connection. The connection between the charger module 420 and the port 408 may allow the battery stack 410 to be charged by both charger modules 420, 430 using power from a power adapter connected to the port 408. The connection between the charger module 430 and the port 406 may allow the battery stack 412 to be charged by both charger modules 420, 430 using power from a power adapter connected to the port 406. By having two charger modules 420, 430 to charge the battery stack 410 or the battery stack 412, the battery stacks 410, 412 may be charged at a relatively higher power. Further, the connection between the charger module 420 and the port 408 may allow both charger modules 420, 430 to provide power from both battery stacks 410, 412 to an OTG device connected to the port 408. The connection between the charger module 430 and the port 406 may allow both charger modules 420, 430 to provide power from both battery stacks 410, 412 to an OTG device connected to the port 406. By using both charger modules 420, 430 to charge an connected OTG device using two battery stacks 410, 412, the OTG device may be charged at a relatively higher power.

Figure 5:
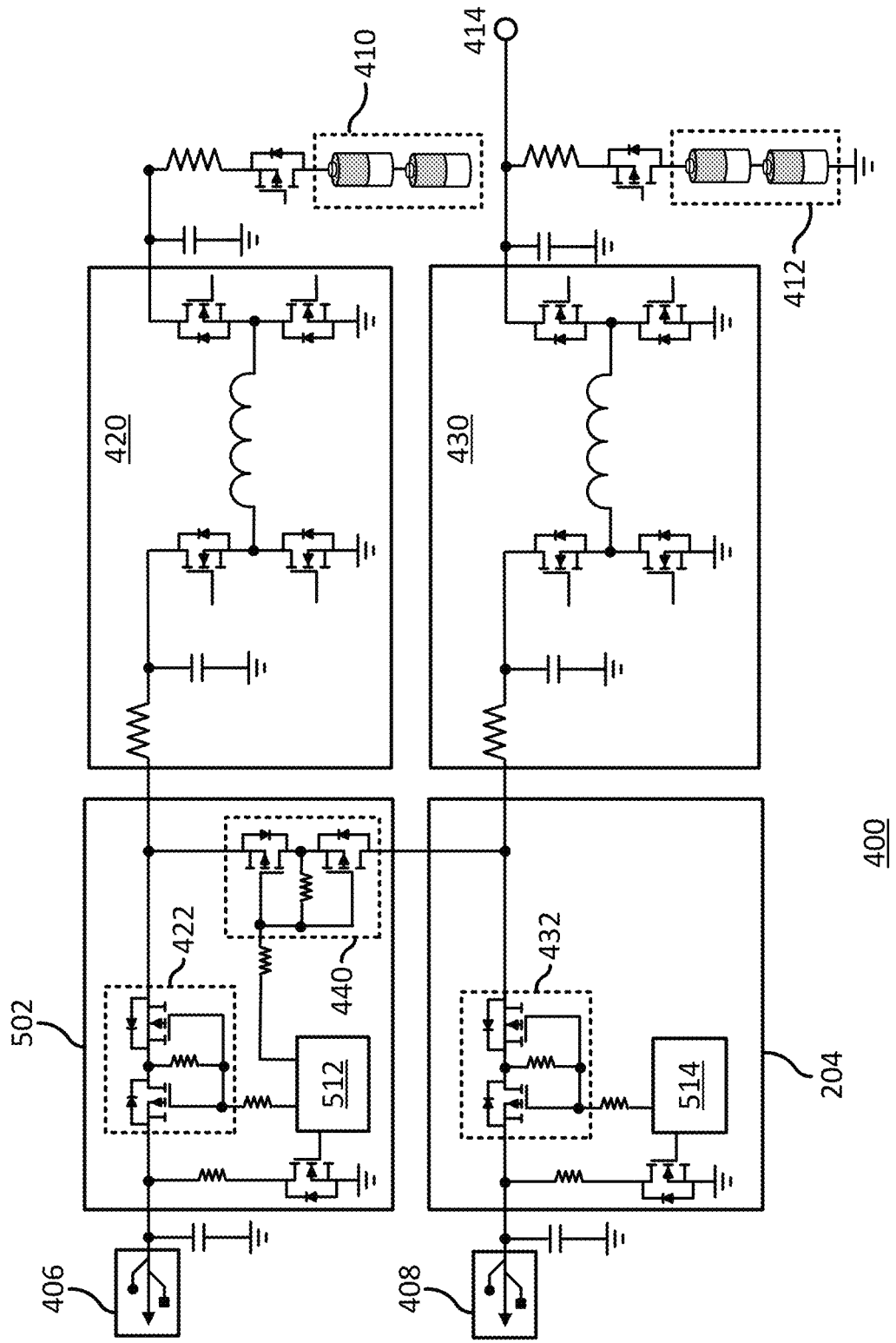
FIG. 5 is a diagram showing details of the example system of FIG. 4 in one embodiment.

FIG. 5 is a diagram showing details of the example system of FIG. 4 in one embodiment. In the example shown in FIG. 5, the switches 422, 440 may be parts of a controller 502. The controller 502 may be configured to detect whether a device is connected to the port 406 or not. A device that may be connected to the port 406 may be, for example, a power adapter, or a power consuming device (e.g., an OTG device). Based on whether a device is connected to the port 406 or not, the controller 502 may turn the switches 422, 440 on or off. For example, in response to a detection that a power adapter or a power consuming device is connected to the port 506, a port detection IC 512 may turn the switch 422 on by supplying a voltage sufficient to drive the gates of the MOSFETs among the switch 422.

Also in the example shown in FIG. 5, the switch 432 may be a part of a controller 504. The controller 504 may be configured to detect whether a device is connected to the port 408 or not. A device that may be connected to the port 408 may be, for example, a power adapter, or a power consuming device (e.g., an OTG device). Based on whether a device is connected to the port 408 or not, the controller 504 may turn the switch 432 on or off. For example, in response to a detection that a power adapter or a power consuming device is connected to the port 408, a port detection IC 514 may turn the switch 432 on by supplying a voltage sufficient to drive the gates of the MOSFETs among the switch 432.

In an example, the port detection IC 512 may turn the switch 440 on or off independently from the switch 420. For example, switches 422, 440 may not need to be on or off simultaneously. In an example, the port detection IC 512 may turn the switch 440 on or off based on a user input (e.g., a button, or a setting in an operating system or software running on the subsystem 402). In another example, the switch 440 may also be a part of the controller 504.

Figure 6A:
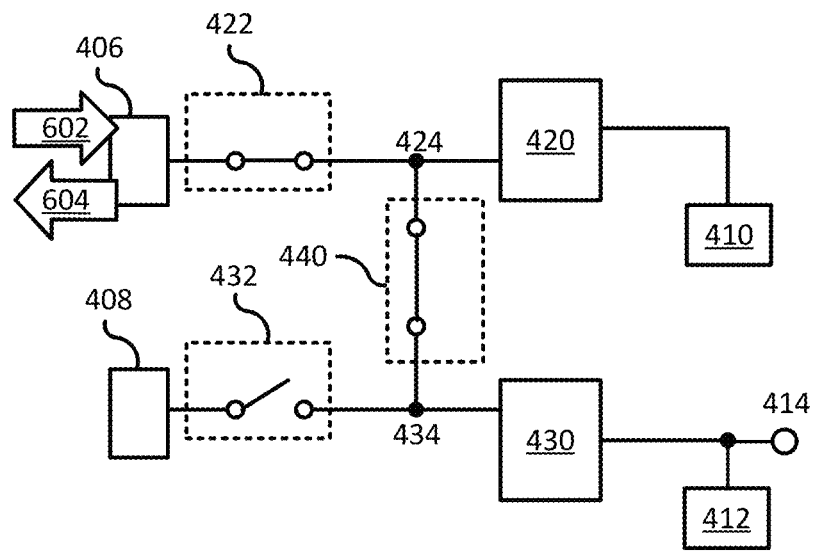
FIG. 6A is a diagram showing an example implementation of the example system of FIG. 4 in one embodiment.

FIG. 6A to FIG. 6D are diagrams showing example implementations of the example system 400 of FIG. 4 and FIG. 5. In FIG. 6A, the switches 422, 440 are switched on and the switch 432 is switched off. The switch 422 may be switched on in response to a power adapter 602, or a OTG device 604, being connected to the port 406. In the example shown in FIG. 6A, in response to the power adapter 602 being connected to the port 406, the charger modules 420 may charge the battery stack 410, and the charger modules 430 may charge the battery stack 412, using power provided by the connected power adapter 602. In other words, the power adapter 602 may charge two battery stacks 410, 412, simultaneously. In the example shown in FIG. 6A, in response to the OTG device 604 being connected to the port 406, the charger modules 420, 430 may provide power from the battery stacks 410, 412, respectively, to the connected OTG device 604. Thus, the OTG device 604 may receive power from two battery stacks 410, 412, simultaneously.

Figure 6B:
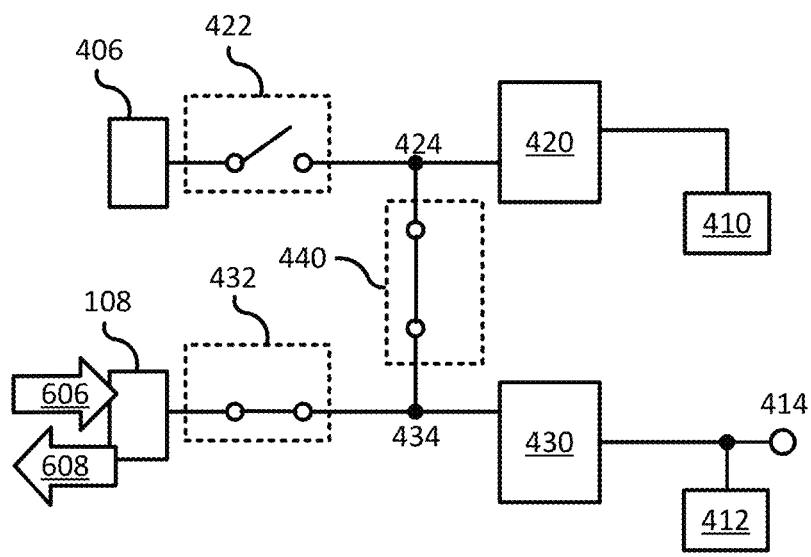
FIG. 6B is a diagram showing an example implementation of the example system of FIG. 4 in one embodiment.

In FIG. 6B, the switches 432, 440 are switched on and the switch 422 is switched off. The switch 432 may be switched on in response to a power adapter 606, or a OTG device 608, being connected to the port 408. In the example shown in FIG. 6B, in response to the power adapter 606 being connected to the port 408, the charger modules 420 may charge the battery stack 410, and the charger modules 430 may charge the battery stack 412, using power provided by the connected power adapter 606. In other words, the adapter 606 may charge two battery stacks 410, 412, simultaneously. In the example shown in FIG. 6B, in response to the OTG device 608 being connected to the port 408, the charger modules 420, 430 may provide power from the battery stacks 410, 412, respectively, to the connected OTG device 608. Thus, the OTG device 608 may receive power from two battery stacks 410, 412, simultaneously.

Figure 6C:
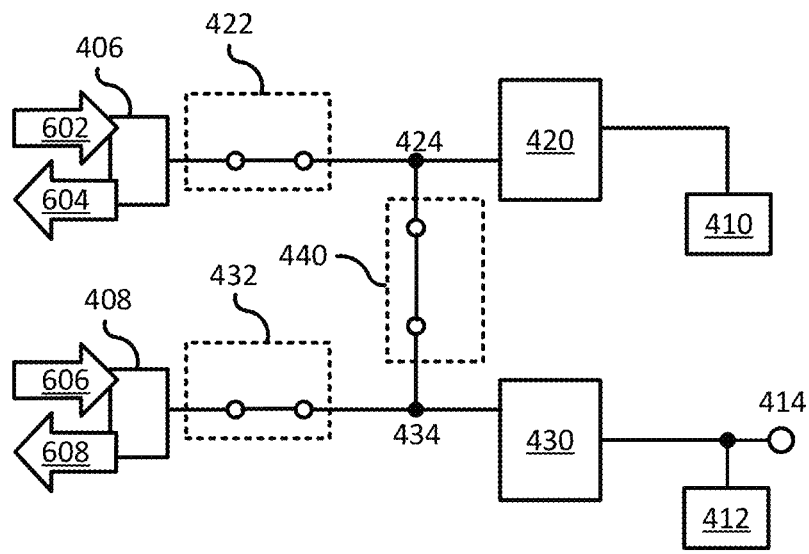
FIG. 6C is a diagram showing an example implementation of the example system of FIG. 4 in one embodiment.

In FIG. 6C, the switches 422, 432, 440 are switched on. The switch 422 may be switched on in response to the power adapter 602, or the OTG device 604, being connected to the port 406. The switch 432 may be switched on in response to the power adapter 606, or the OTG device 608, being connected to the port 408. In the example shown in FIG. 6C, in response to the power adapter 602 being connected to the port 406 and the power adapter 606 being connected to the port 408, the charger module 420 may charge the battery stack 410 using power provided by the power adapter 602 and the charger module 430 may charge the battery stack 412 using power provided by the power adapter 606.

In the example shown in FIG. 6C, in response to the OTG device 604 being connected to the port 406 and the OTG device 608 being connected to the port 408, the charger module 420 may provide power from the battery stack 410 to the OTG device 604 and the charger module 430 may provide power from the battery stack 412 to the OTG device 608.

In the example shown in FIG. 6C, in response to the OTG device 604 being connected to the port 406 and the power adapter 606 being connected to the port 408, the charger module 420 may provide power from the battery stack 410 to the OTG device 604 and the charger module 430 may charge the battery stack 412 using power from the power adapter 606. However, if the load 414 is a computing system that rejects the OTG device 604 connected to the port 406, then the charger modules 420, 430 may both charge the battery stacks 410, 412, respectively, using power from the power adapter 606 connected to the port 408.

In the example shown in FIG. 6C, in response to the OTG device 608 being connected to the port 408 and the power adapter 602 being connected to the port 406, the charger module 430 may provide power from the battery stack 412 to the OTG device 608 and the charger module 420 may charge the battery stack 410 using power from the power adapter 602. However, if the load 414 is a computing system that rejects the OTG device 608 connected to the port 408, then the charger modules 420, 430 may both charge the battery stacks 410, 412 using power from the power adapter 602 connected to the port 406.

Figure 6D:
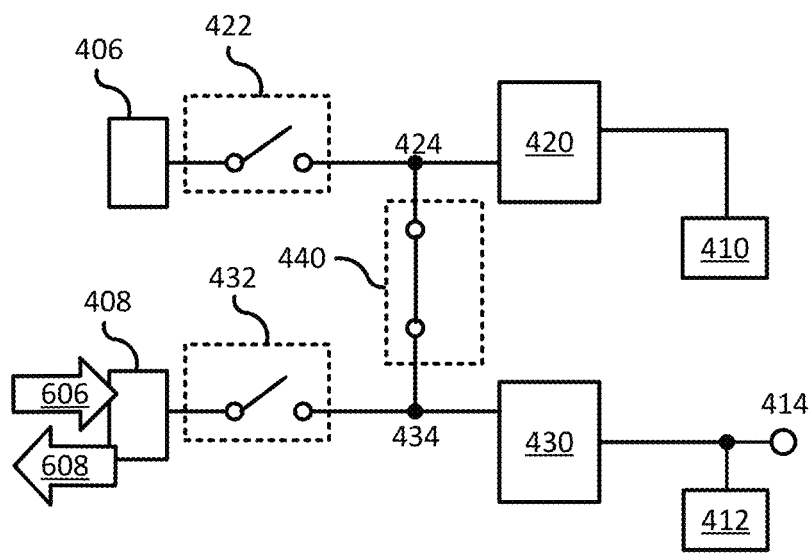
FIG. 6D is a diagram showing an example implementation of the example system of FIG. 4 in one embodiment.

In FIG. 6D, the switch 440 is switched on and the switches 422, 432 are switched off. The switch 440 may be switched on in response to, for example, a user input to the system 400 (e.g., a button, or settings in applications or software being run by the system 400). In the example shown in FIG. 6D, in response to the switch 440 being switched on and the switches 420, 430 being switched off, the system 400 may operate in a battery-only mode. In the battery-only mode, the battery stack 412 may be discharged to provide power to the load 414. Also, if the battery stack 412 is fully charged and the battery stack 410 is fully discharged, then the charger module 420 may charge the battery stack 410 using power from the battery stack 412 via the switch 440. Similarly, if the battery stack 410 is fully charged and the battery stack 412 is fully discharged, then the charger module 430 may charge the battery stack 412 using power from the battery stack 410 via the switch 440. In an example, the charger modules 420, 430 may be configured to detect whether the battery stacks 410, 412, are fully charged o fully discharged, respectively.

Figure 7A:
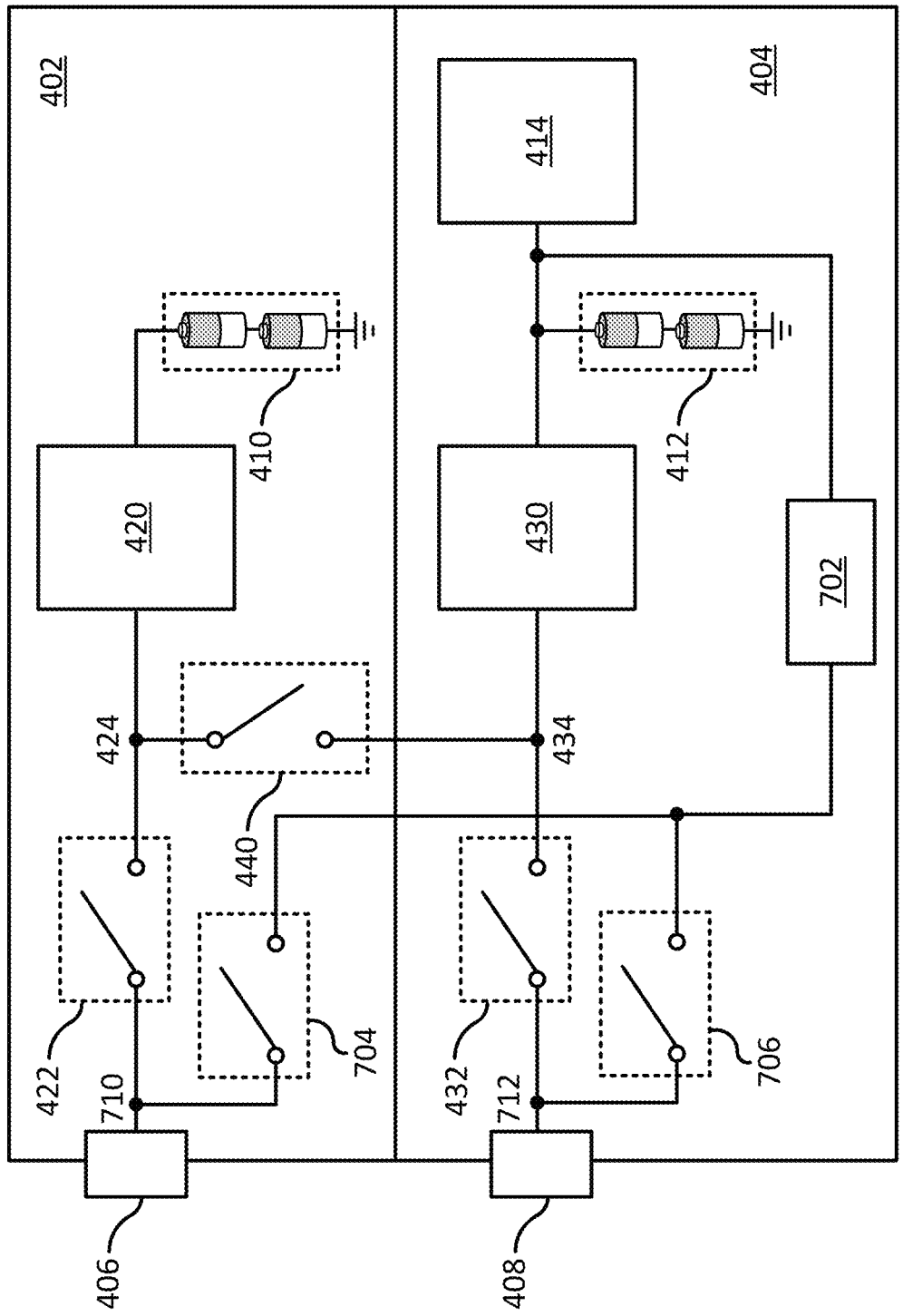
FIG. 7A is a diagram showing another embodiment of the example system of FIG. 4 in one embodiment.
Figure 7B:
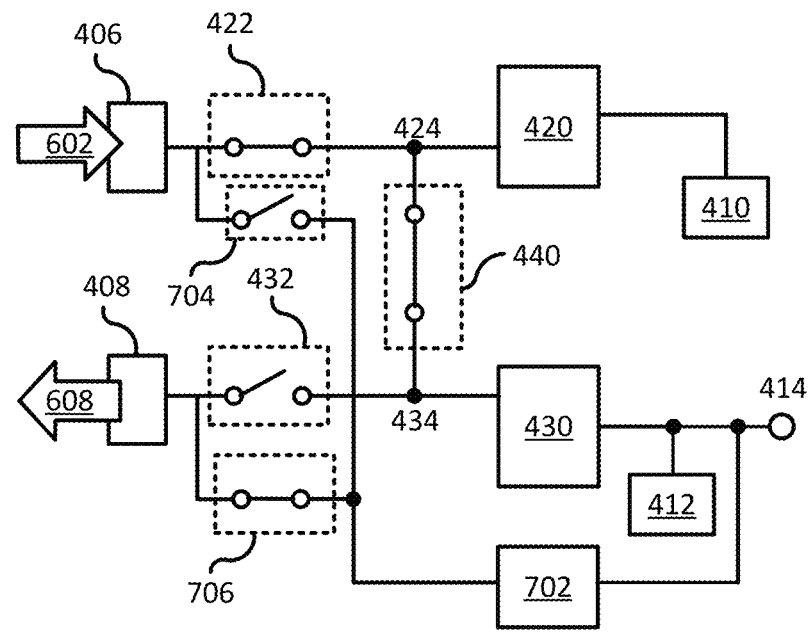
FIG. 7B is a diagram showing another embodiment of the example system of FIG. 4 in one embodiment.
Figure 7C:
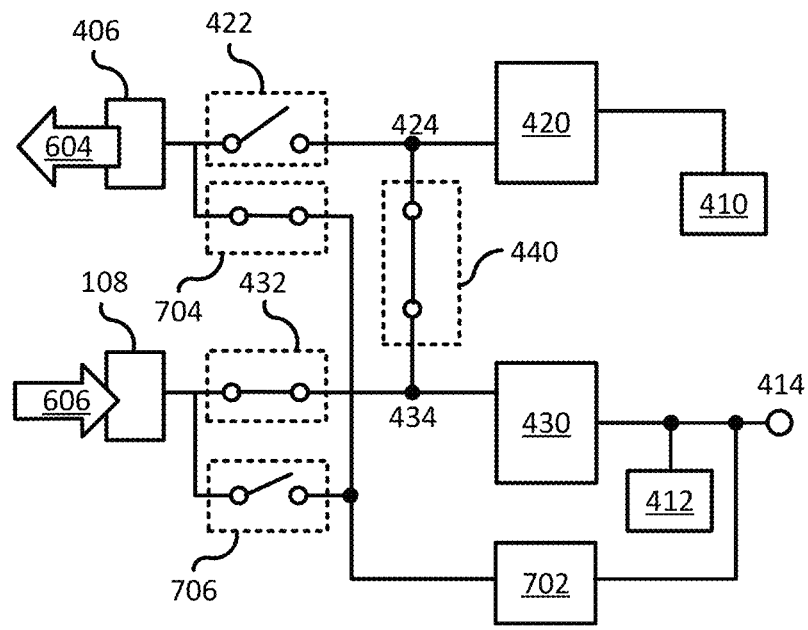
FIG. 7C is a diagram showing another embodiment of the example system of FIG. 4 in one embodiment.

FIG. 7A to 7C are diagrams showing another embodiment of the example system 400 of FIG. 4 in one embodiment. In an example shown in FIG. 7A, a voltage regulator 702, a switch 704, and a switch 706, may be added to the system 400. In an example, the voltage regulator 702 may be a 5V buck converter that may provide 5V to OTG devices connected to the ports 406, 408 through the switches 704, 706. In another example, the voltage regulator 702 may be other types of converters such as boost or buck-boost regulators if the system 400 is designed for providing other voltages to OTG devices connected to the ports 406, 408 through the switches 704, 706. Each one of the switches 704, 706 may be implemented using, for example, field-effect transistors (FET) such as metal-oxide semiconductor field-effect transistors (MOSFET), power MOSFET, or other suitable semiconductor transistor device capable of being switched on and off in response to a control signal. For example, the switches 704, 706 may be FETs that can be switched on (e.g., closed or conducting) or off (e.g., open or not conducting) in response to control signals being applied to their gate terminals.

The switch 704 may be connected between a node 710 and the voltage regulator 702, where the node 710 may be located between the port 406 and the switch 422. The switch 706 may be connected between a node 712 and the voltage regulator 702, where the node 712 may be located between the port 408 and the switch 432. The switch 704 may be a part of the controller 502 in FIG. 5, and the switch 706 may be a part of the controller 504 in FIG. 5. In response to the switch 704 being switched on, the voltage regulator 702 may be connected to the port 406. In response to the switch 706 being switched on, the voltage regulator 702 may be connected to the port 408. By connecting the voltage regulator 702 to the port 406 and/or the port 408, the voltage regulator 702 may be configured to provide power to an OTG device connected to the port 406 and/or the port 408.

For example, in an example shown in FIG. 7B, the switches 422, 440, 706 are switched on, the switches 432, 704 are switched off. The switch 422 may be switched on in response to the power adapter 602 being connected to the port 406. The switch 706 may be switched on in response to the OTG device 608 being connected to the port 408. In response to the power adapter 602 being connected to the port 406, the charger modules 420,430 may charge the battery stack 410, 412, respectively, using power provided by the connected power adapter 602. In other words, the power adapter 602 may charge two battery stacks 410, 412, simultaneously. Further, in response to the switch 706 being switched on, the voltage regulator 702 may use power from the battery stack 412 to provide power to the OTG device 608 connected to the port 608.

In an example shown in FIG. 7C, the switches 432, 440, 704 are switched on, the switches 422, 706 are switched off. The switch 432 may be switched on in response to the power adapter 606 being connected to the port 408. The switch 704 may be switched on in response to the OTG device 604 being connected to the port 406. In response to the power adapter 606 being connected to the port 408, the charger modules 420,430 may charge the battery stack 410, 412, respectively, using power provided by the connected power adapter 606. In other words, the power adapter 606 may charge two battery stacks 410, 412, simultaneously. Further, in response to the switch 704 being switched on, the voltage regulator 702 may use power from the battery stack 412 to provide power to the OTG device 604 connected to the port 606.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a first controller;
a first port connected to the first controller;
a first charger module connected to the first port, via the first controller;
a second controller;
a second port connected to the second controller;
a second charger module connected to the second port, via the second controller;
the first controller being configured to:
form a first connection path between the first charger module and the second port via the second controller; and
form a second connection path between the second charger module and the first port via the first controller.

2. The apparatus of claim 1, wherein the first port and the second port are universal serial bus type-C ports.

3. The apparatus of claim 1,
wherein the first charger module and the second charger module are configured to be connected to a battery, and
wherein, in response to the first connection path being formed:
the first charger module is configured to use power from a power adapter connected to the second port to charge the battery; and
the second charger module is configured to use the power from the power adapter connected to the second port to charge the battery.

4. The apparatus of claim 1,
wherein the first charger module and the second charger module are connected to a battery, and
wherein in response to the first connection path being formed:
the first charger module is configured to provide power from the battery to a device connected to the second port; and
the second charger module is configured to provide the power from the battery to the device connected to the second port.

5. The apparatus of claim 1, wherein a first battery is connected to the first charger module and a second battery is connected to the second charger module, and in response to the first connection path being formed:
the first charger module is configured to use power from a power adapter connected to the second port to charge the first battery; and
the second charger module is configured to use the power from the power adapter connected to the second port to charge the second battery.

6. The apparatus of claim 1, wherein a first battery is connected to the first charger module and a second battery is connected to the second charger module, and in response to the first connection path being formed:
the first charger module is configured to provide power from the first battery to the device connected to the second port; and
the second charger module is configured to provide power from the second battery to the device connected to the second port.

7. The apparatus of claim 1, wherein:
a first battery is connected to the first charger module;
a second battery is connected to the second charger module;
the first controller is configured to form a third connection path between the first charger module and the second charger module;
in response to the third connection path being formed, the first battery being fully discharged, and the second battery being fully charged, the first charger module is configured to charge the first battery using the second battery.

8. The apparatus of claim 1, further comprising a voltage regulator, wherein:
the voltage regulator is connected to the first port via a first switch;
the voltage regulator is connected to the second port via a second switch;
the first charger module is connected to a first battery stack;
the second charger module is connected to a second battery stack; and
in response to the first connection path being formed, and in response to the second switch being switched on, the first charger module and the second charger module are configured to provide power from a power adapter connected to the second port to the first and second battery stacks, and the voltage regulator is configured to provide power to a device connected to the first port.

9. The apparatus of claim 8, wherein the voltage regulator is a buck converter.

10. An apparatus comprising:
a first port connected to a controller;
a first charger module connected to the controller, wherein the controller is connected between the first port and the first charger module;
the controller being configured to:
form a first connection path, between the first charger module and a second port of a subsystem connected to the apparatus, via the controller; and
form a second connection path, between a second charger module of the subsystem and the first port, via the controller, the second charger module being connected to a battery.

11. The apparatus of claim 10, wherein the first port and the second port are universal serial bus type-C ports.

12. The apparatus of claim 10, wherein the battery is connected to the first charger module, and in response to the first connection path being formed, the first charger module is configured to use power from a power adapter connected to the second port to charge the battery.

13. The apparatus of claim 10, wherein a battery is connected to the first charger module, and in response to the first connection path being formed, the first charger module is configured to provide power from the battery to a device connected to the second port.

14. The apparatus of claim 10, wherein the battery connected to the second charger module is a first battery, and a second battery is connected to the first charger module, and in response to the first connection path being formed, the first charger module is configured to use power from a power adapter connected to the second port to charge the second battery.

15. The apparatus of claim 10, wherein the battery connected to the second charger module is a first battery, and a second battery is connected to the first charger module, and in response to the first connection path being formed, the first charger module is configured to provide power from the second battery to the device connected to the second port.

16. The apparatus of claim 10, wherein:
the battery connected to the second charger module is a first battery,
a second battery is connected to the first charger module;
the controller is configured to:
form a third connection path between the first charger module and the second charger module; and
in response to the third connection path being formed, charge the second battery using the first battery.

17. An apparatus comprising:
a first port connected to a first switch;
a first charger module connected between the first switch and one or more batteries;
a second port connected to a second switch;
a second charger module connected between the second switch and the one or more batteries; and
a third switch connected between a first node and a second node, the first node being between the first charger module and the first switch, and the second node being between the second charger module and the second switch,
wherein in response to the third switch being switched on, the first charger module is connected to the second port in response to the second switch being switched on, and the second charger module is connected to the first port in response to the first switch being switched on.

18. The apparatus of claim 17, wherein the first port and the second port are universal serial bus type-C ports.

19. The apparatus of claim 17, wherein the one or more batteries include a first battery and a second battery, the first battery being connected to the first charger module, the second battery being connected to the second charger module.

20. The apparatus of claim 17, further comprising a voltage regulator, wherein:
the one or more batteries include a first battery and a second battery;
the first battery being connected to the first charger module;
the second battery being connected to the second charger module;
a fourth switch connected between the first port and the voltage regulator;
a fifth switch connected between the second port and the voltage regulator;
in response to the first switch, the third switch, and the fifth switch being switched on, the second switch and the fourth switch being switched off:
the first charger module and the second charger module are configured to provide power from a power adapter connected to the first port to the first and second batteries; and
the voltage regulator is configured to provide power to a device connected to the second port.

* * * * *